: (12) United States Patent
Kono et al.

(10) Patent No.: US 9,389,687 B2
(45) Date of Patent: Jul. 12, 2016

(54) TACTILE SENSATION PROVIDING APPARATUS AND CONTROL METHOD FOR TACTILE SENSATION PROVIDING APPARATUS

(75) Inventors: Kenji Kono, Yokohama (JP); Takashi Miyake, Sagamihara (JP); Takayuki Shinozaki, Yokohama (JP); Megumi Kuwabara, Yokohama (JP); Jun Takeda, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 106 days.

(21) Appl. No.: 13/812,397

(22) PCT Filed: Jul. 5, 2011

(86) PCT No.: PCT/JP2011/003838
§ 371 (c)(1),
(2), (4) Date: Feb. 12, 2013

(87) PCT Pub. No.: WO2012/014385
PCT Pub. Date: Feb. 2, 2012

(65) Prior Publication Data
US 2013/0207918 A1    Aug. 15, 2013

(30) Foreign Application Priority Data

Jul. 27, 2010  (JP) ................................ 2010-168564

(51) Int. Cl.
*G06F 3/041* (2006.01)
*G06F 3/01* (2006.01)
(52) U.S. Cl.
CPC .......... *G06F 3/016* (2013.01); *G06F 2203/014* (2013.01); *G06F 2203/04105* (2013.01)
(58) Field of Classification Search
CPC ....................................... G06F 3/014

USPC .......................................... 345/173; 310/314
See application file for complete search history.

(56) References Cited

U.S. PATENT DOCUMENTS 7,579,758 B2    8/2009  Maruyama et al.
2008/0024459 A1  1/2008  Poupyrev et al.
(Continued)

FOREIGN PATENT DOCUMENTS

CN    101118469 A    2/2008
CN    101620510 A    1/2010
(Continued)

OTHER PUBLICATIONS

International Search Report for PCT/JP2011/003838 mailed Aug. 16, 2011.
(Continued)

*Primary Examiner* — Dwayne Bost
*Assistant Examiner* — Sepehr Azari
(74) *Attorney, Agent, or Firm* — Studebaker & Brackett PC

(57) ABSTRACT

A tactile sensation is provided without exchanging a signal indicating a pressing load between a dual chip. A tactile sensation providing apparatus includes a touch sensor, a load detection unit for detecting a pressing load on the sensor, a tactile sensation providing unit for vibrating a face of the sensor, a tactile sensation provision control unit for controlling drive of the providing unit, and a main control unit for controlling an operation of the provision control unit based on an output of the sensor. The main control unit determines whether a predetermined area of the touch face is touched based on the output of the sensor and, when the area is touched, transmits a tactile sensation control instruction to the provision control unit. The provision control unit, upon receiving the instruction from the main control unit, controls drive of the providing unit based on the instruction and the pressing load.

4 Claims, 7 Drawing Sheets

(56) References Cited

U.S. PATENT DOCUMENTS

| | | | |
|---|---|---|---|
| 2008/0122315 A1* | 5/2008 | Maruyama et al. ........... | 310/314 |
| 2009/0153489 A1 | 6/2009 | Murakami et al. | |
| 2009/0262091 A1 | 10/2009 | Ikeda et al. | |
| 2010/0085169 A1 | 4/2010 | Poupyrev et al. | |
| 2011/0181539 A1 | 7/2011 | Aono | |

FOREIGN PATENT DOCUMENTS

| | | | |
|---|---|---|---|
| JP | 10-293644 | A | 11/1998 |
| JP | 2007-207110 | A | 8/2007 |
| JP | 2008033739 | A | 2/2008 |
| JP | 2008-123453 | A | 5/2008 |
| JP | 2009-053857 | A | 3/2009 |
| JP | 2009-146212 | A | 7/2009 |
| JP | 2010-086471 | A | 4/2010 |
| JP | 2010-152736 | A | 7/2010 |
| TW | 201017491 | A | 5/2010 |

OTHER PUBLICATIONS

The Taiwanese Office Action issued on Oct. 29, 2013, which corresponds to Taiwanese Patent Application No. 100125294 and is related to U.S. Appl. No. 13/812,397; with English language concise explanation.

An Office Action issued by the Korean Patent Office on Feb. 28, 2014, which corresponds to Korean Patent Application No. 10-2013-7004753 and is related to U.S. Appl. No. 13/812,397; with English language concise explanation.

An Office Action; "Notice of Reason for Rejection," issued on Mar. 25, 2014, which corresponds to Japanese Patent Application No. 2010-168564 and is related to U.S. Appl. No. 13/812,397; with English language concise explanation.

An Office Action; "Notice of Reason for Rejection," issued on Oct. 22, 2013, which corresponds to Japanese Patent Application No. 2010-168564 and is related to U.S. Appl. No. 13/812,397; with English concise explanation.

Notification of the First Office Action issued by the State Intellectual Property Office of China on Feb. 13, 2015, which corresponds to Chinese Patent Application No. 201180036916.7 and is related to U.S. Appl. No. 13/812,397; with English language translation.

An Office Action; "Notice of Reasons for Rejection," issued by the Japanese Patent Office on Aug. 4, 2015, which corresponds to Japanese Patent Appeal No. 2014-20878 (Japanese Patent Application No. 2010-168564) and is related to U.S. Appl. No. 13/812,397; with English language statement of relevance.

* cited by examiner

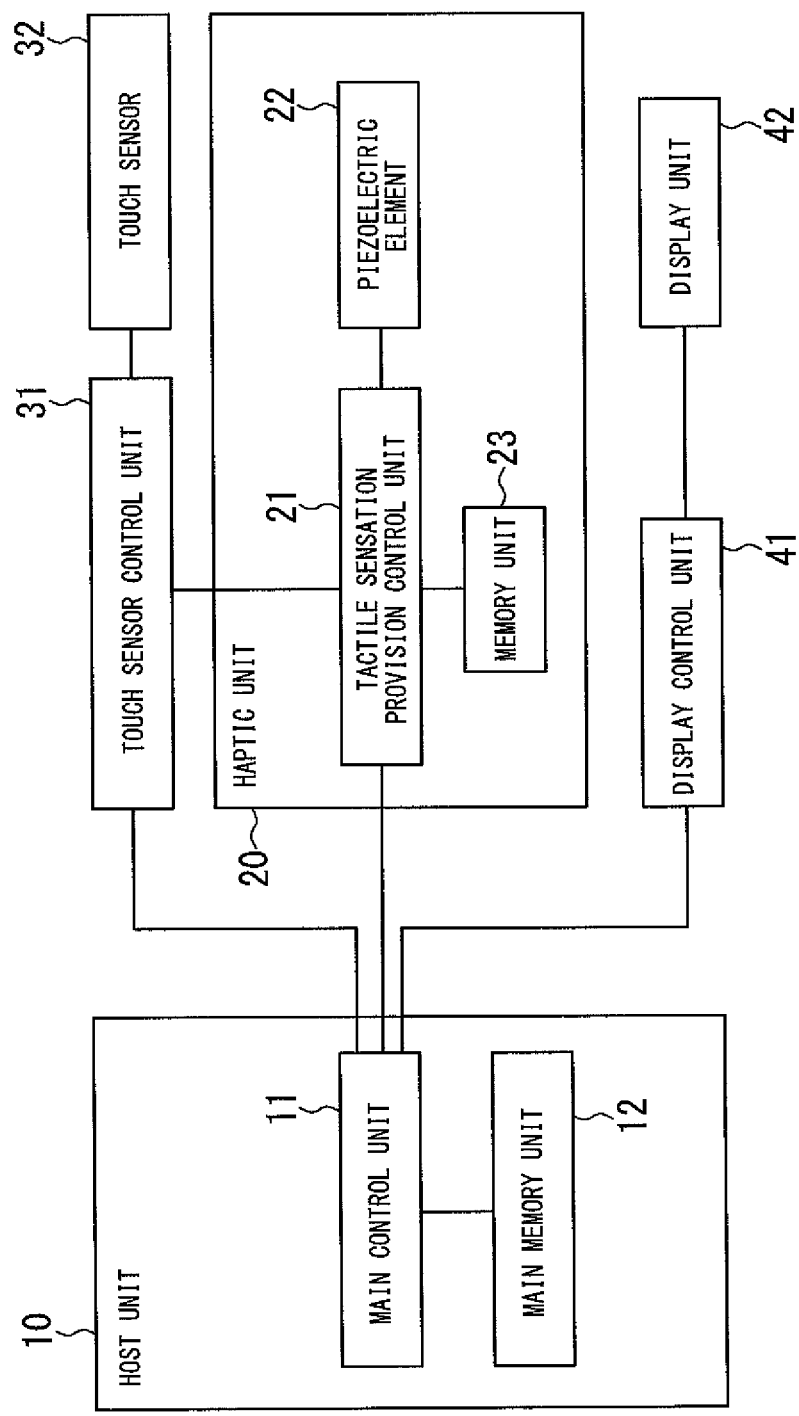

TACTILE SENSATION PROVIDING APPARATUS AND CONTROL METHOD FOR TACTILE SENSATION PROVIDING APPARATUS

CROSS REFERENCE TO RELATED APPLICATION

This application claims priority to and the benefit of Japanese Patent Application No. 2010-168564 (filed on Jul. 27, 2010), the entire contents of which are incorporated herein by reference.

TECHNICAL FIELD

The present invention relates to a tactile sensation providing apparatus having a touch sensor and a control method for the tactile sensation providing apparatus.

BACKGROUND ART

In recent years, input apparatuses having touch sensors such as touch panels, touch switches or the like are popularly used as input apparatuses such as operation units for receiving input operations by operators in mobile devices such as mobile phones and gaming machines, information equipments such as calculator and ticket vending machines, home electric appliances such as microwaves, TV sets and lighting equipments, industrial equipments (FA equipments) and the like.

There are known a variety of types of the touch sensors, such as a resistive film type, a capacitive type, an optical type and the like. However, the touch sensors of these types receive a touch input (input operation) by a pressing means (an object) such as a finger or a stylus pen and, unlike push-button switches, the touch sensors themselves are not physically displaced when being touched.

As such, there is suggested an input apparatus that, for example, vibrates the touch sensor when the input apparatus detects an input applying a predetermined pressing load or greater to a predetermined area of the touch sensor, such that a tactile sensation is provided at operator's fingertip as feedback (for example, see Patent Document 1).

RELATED ART DOCUMENT

Patent Document

Patent Document 1: Japanese Patent Laid-Open No. 10-293644

SUMMARY OF INVENTION

Technical Problem

A function to provide the tactile sensation by vibrating the touch sensor may be implemented by a chip such as a dedicated processor, a piezoelectric element and the like. For example, by combining a touch sensor apparatus having no function to provide the tactile sensation with a chip having the function to provide the tactile sensation, the function to provide the tactile sensation is introduced to a variety of touch sensor apparatuses and enables the touch sensor apparatuses to function as the tactile sensation providing apparatus. In this case, the tactile sensation providing apparatus includes a dual chip: a control chip for controlling an application and the entire apparatus including the touch sensor and the like; and a chip for controlling provision of the tactile sensation. However, no prior art has been considered about the tactile sensation providing apparatus having the dual chip structure.

Preferably, the tactile sensation is provided in association with a user interface such as the application and an operation system. In detail, when there is a touch input to a predetermined area (tactile sensation providing area) for providing the tactile sensation in response to the touch input, such as a push button and an icon of the user interface of the application, an appropriate tactile sensation is expected to be provided in response to the touch input. Here, although a conventional touch sensor detects position information of the touch input, the conventional touch sensor does not detect a pressing load of the touch input. On the other hand, the tactile sensation providing chip, in order to control provision of the tactile sensation when there is a pressing load equal to or greater than a predetermined value, detects the pressing load of the touch input by using, for example, the piezoelectric element. Accordingly, the control chip for controlling the entire apparatus including the application and the like, in order to control application processing based on the pressing load, needs to obtain the pressing load from the tactile sensation providing chip. However, constant exchange of a signal indicating the pressing load between the dual chip increases a processing load of the entire apparatus and power consumption.

Accordingly, an object of the present invention in consideration of such a condition is to provide a tactile sensation providing apparatus capable of providing a desired tactile sensation without exchange of the signal indicating the pressing load between the dual chip.

Solution to Problem

In order to achieve the above object, a tactile sensation providing apparatus according to a first aspect of the present invention includes:
a touch sensor;
a load detection unit configured to detect a pressing load on the touch sensor;
a tactile sensation providing unit configured to vibrate a touch face of the touch sensor;
a tactile sensation provision control unit configured to control drive of the tactile sensation providing unit; and
a main control unit configured to control drive of the tactile sensation provision control unit based on an output of the touch sensor, wherein
the main control unit determines whether a predetermined area of the touch face is touched based on the output of the touch sensor and, when the predetermined area is touched, transmits a tactile sensation control instruction to the tactile sensation provision control unit, and
the tactile sensation provision control unit, upon receiving the tactile sensation control instruction from the main control unit, controls drive of the tactile sensation providing unit based on the tactile sensation control instruction and the pressing load.

In order to achieve the above object, a control method for a tactile sensation providing apparatus according to a second aspect of the present invention including
a touch sensor,
a load detection unit configured to detect a pressing load on the touch sensor,
a tactile sensation providing unit configured to vibrate a touch face of the touch sensor,
a tactile sensation provision control unit configured to control drive of the tactile sensation providing unit, and a main control unit configured to control drive of the tactile sensation provision control unit based on an output of the touch sensor, includes steps for:

the main control unit determining whether a predetermined area of the touch face is touched based on the output of the touch sensor and, when the predetermined area is touched, to transmit a tactile sensation control instruction to the tactile sensation provision control unit; and the tactile sensation provision control unit controlling drive of the tactile sensation providing unit, upon receiving the tactile sensation control instruction from the main control unit, based on the tactile sensation control instruction and the pressing load.

Moreover, in order to achieve the above object, a tactile sensation providing apparatus according to a third aspect of the present invention includes:

a touch sensor;

a load detection unit configured to detect a pressing load on the touch sensor;

a tactile sensation providing unit configured to vibrate a touch face of the touch sensor;

a tactile sensation provision control unit configured to control drive of the tactile sensation providing unit; and a main control unit configured to control an application associated with provision of a tactile sensation, wherein the main control unit transmits a notification about the application to the tactile sensation provision control unit, and the tactile sensation provision control unit, upon receiving the notification from the main control unit, controls drive of the tactile sensation providing unit based on an output of the touch sensor, the notification and the pressing load.

Further, in order to achieve the above object, a control method for a tactile sensation providing apparatus according to a fourth aspect of the present invention including a touch sensor, a load detection unit configured to detect a pressing load on the touch sensor, a tactile sensation providing unit configured to vibrate a touch face of the touch sensor, a tactile sensation provision control unit configured to control drive of the tactile sensation providing unit, and a main control unit configured to control an application associated with provision of a tactile sensation, includes steps for:

the main control unit transmitting a notification about the application to the tactile sensation provision control unit; and the tactile sensation provision control unit controlling drive of the tactile sensation providing unit, upon receiving the notification from the main control unit, based on an output of the touch sensor, the notification and the pressing load.

Effect of the Invention

According to the present invention, a predetermined tactile sensation may be provided without exchange of a signal indicating the pressing load between a dual chip.

BRIEF DESCRIPTION OF DRAWINGS

FIG. 7 is a functional block diagram illustrating a schematic configuration of a tactile sensation providing apparatus according to a third embodiment of the present invention.

DESCRIPTION OF EMBODIMENTS

Embodiments of the present invention will be described with reference to the accompanying drawings.

Figure 1:
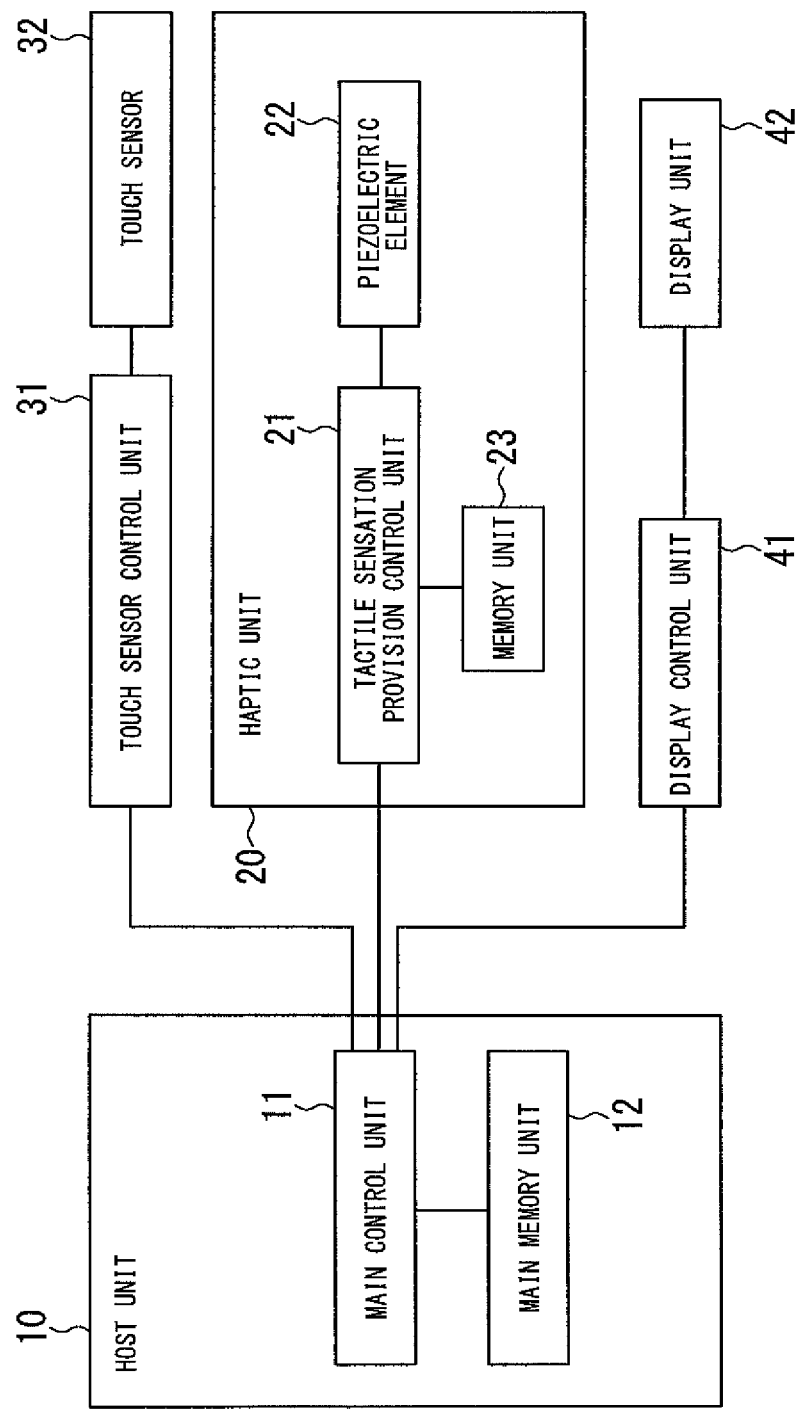
FIG. 1 is a functional block diagram illustrating a schematic configuration of a tactile sensation providing apparatus according to a first embodiment of the present invention.

FIG. 1 is a functional block diagram illustrating a schematic configuration of a tactile sensation providing apparatus according to a first embodiment of the present invention. The tactile sensation providing apparatus includes a host unit 10 for controlling overall operations of the tactile sensation providing apparatus, a haptic unit 20 for controlling provision of a tactile sensation, a touch sensor control unit 31, a touch sensor 32, a display control unit 41 and a display unit 42.

The host unit 10 includes a main control unit 11 and a main memory unit 12. The main control unit 11 is configured by using any appropriate processor such as CPU (Central Processing Unit) and controls overall operations of the tactile sensation providing apparatus such as application processing and a user interface. Here, the application processing includes operations by software such as an operating system and middleware as well as an individual application. The main memory unit 12 stores an application program and a plurality of parameter tables for providing the tactile sensation. The parameter table will be described in detail below.

The haptic unit 20 includes a tactile sensation provision control unit 21, a piezoelectric element 22 and a memory unit 23. The tactile sensation provision control unit 21 is configured by using a dedicated processor (for example, DSP (Digital Signal Processor)). The piezoelectric element 22 of the haptic unit 20 serves as a tactile sensation providing unit for vibrating a touch face 32a of the touch sensor and also as a load detection unit for detecting a pressing load on the touch sensor 32. The pressing load detected by the piezoelectric element 22 is supplied to the tactile sensation provision control unit 21. The tactile sensation provision control unit 21, based on the pressing load detected by the piezoelectric element 22, controls drive of the piezoelectric element 22. The memory unit 23 stores a plurality of parameter tables for providing the tactile sensation. Here, the parameter tables stored in the memory unit 23 are also stored in the main memory unit 12 of the host unit 10. That is, the host unit 10 and the haptic unit 20 store common parameter tables for providing the tactile sensation.

The parameter table for providing the tactile sensation includes various parameters such as the number of pressing steps, the number of releasing steps, a pressing threshold, a releasing threshold, a pressing vibration pattern, a releasing vibration pattern, vibration intensity and a calibration parameter. As the number of pressing steps, the number of steps (times) to provide a tactile sensation (pressing sensation) to an object such as a finger or the like while the object is pressing the touch sensor 32 is set. As the number of releasing steps, the number of steps to provide a tactile sensation (releasing sensation) to the object while the object is releasing the touch sensor 32 is set. As the pressing threshold and the releasing threshold, a load threshold at the pressing step and that at the releasing step are respectively set. As the pressing vibration pattern and the releasing vibration pattern, a pattern of a drive signal to be provided to the piezoelectric element 22 for providing the pressing sensation and the release sensation are respectively set. Based on the pressing vibration pattern and the releasing vibration pattern, a click sensation, a pressing sensation and the like obtained when pressing a push-button switch are provided. As the vibration intensity, vibration intensity of each of the pressing vibration pattern and the releasing vibration pattern is set. As the calibration parameters, the vibration intensity and input sensitivity for each tactile sensation providing area are set.

The touch sensor 32 receives a touch input to the display unit 42 by a pressing means (the object) such as the finger and the like and is configured by using, for example, a touch panel, a touch switch or the like of a known type such as a resistive film type, a capacitive type, an optical type and the like. Input position information of the object on a touch face 32*a* (see FIG. 2) of the touch sensor 32 is detected by the touch sensor control unit 31 based on an output of the touch sensor 32. According to the present embodiment, the touch sensor 31 and the main control unit 11 of the host unit 10 are connected to each other such that, when there is the touch input to the touch sensor 32, the touch sensor control unit 31 supplies the input position information of the touch input to the main control unit 11 of the host unit 10.

The display unit 42 is controlled by the main control unit 11 via the display control unit 41. Thereby, the display unit 42 displays the user interface based on the application. In the user interface, the display unit 42 displays a tactile sensation providing area such as, for example, the push-button switch (push type button switch) and the like. The display unit 42 is configured by using, for example, a liquid crystal display panel, an organic EL display panel and the like.

Figure 2:
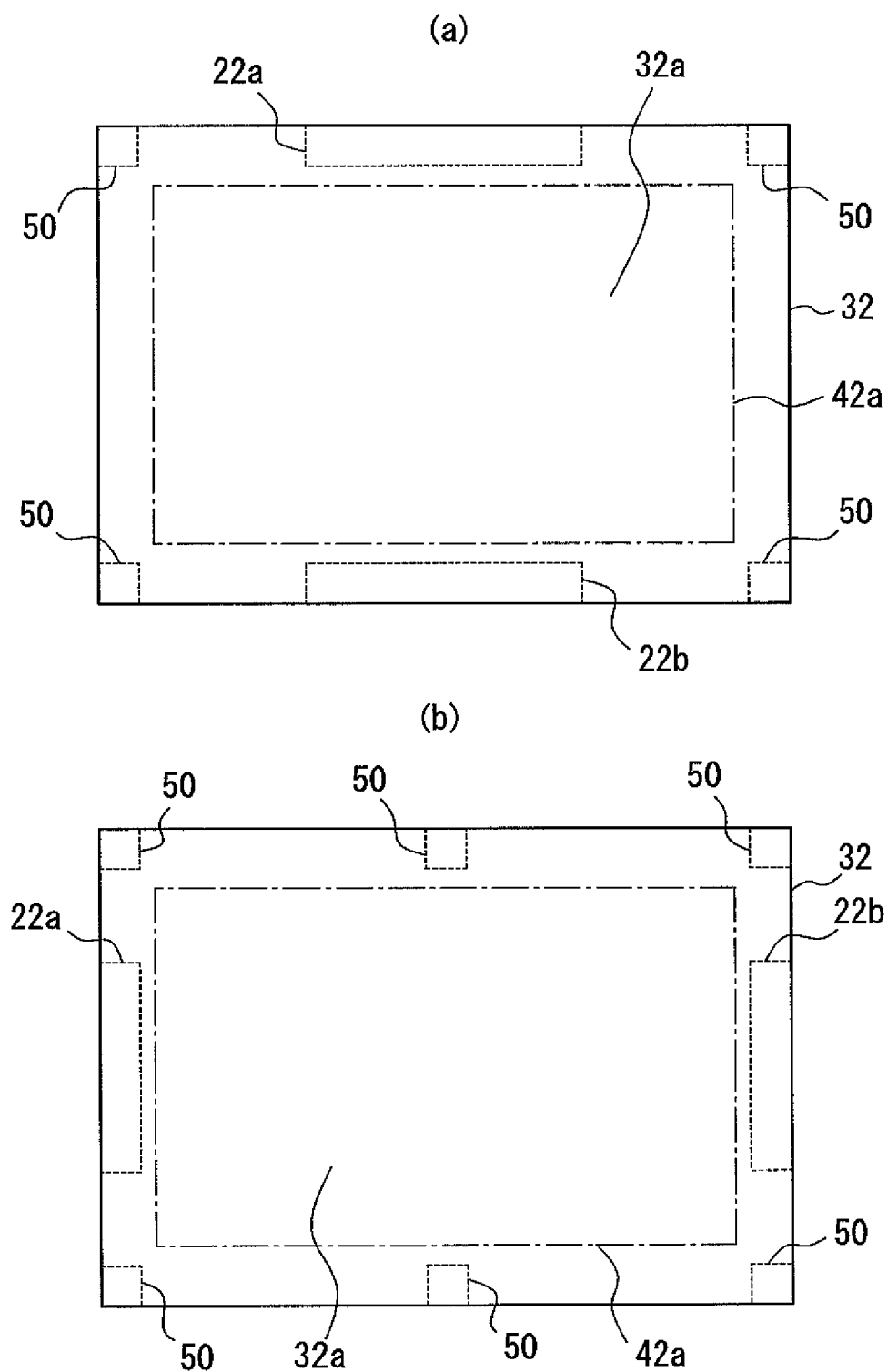
FIG. 2(a) and FIG. 2(b) are plane views illustrating two examples of a schematic configuration of a supporting structure of a touch sensor illustrated in FIG. 1.

FIG. 2(*a*) and FIG. 2(*b*) are plane views illustrating two examples of a schematic configuration of a supporting structure of the touch sensor 32 illustrated in FIG. 1. In the supporting structure illustrated in FIG. 2(*a*), the touch sensor 32 is rectangular in shape in a planar view and bendably supported on the display unit 42 (see FIG. 1) via support members 50 at four corners on a rear side of the touch sensor 32. On the rear side of the touch sensor 32 outside a display area 42*a* of the display unit 42 indicated by dashed lines in the figure, piezoelectric elements 22*a*, 22*b* in the shape of a strip are adhered along each of two long sides at a center thereof. The piezoelectric elements 22*a*, 22*b* construct the piezoelectric element 22 in FIG. 1.

Accordingly, the touch sensor 32 slightly bends when the touch face 32*a* is pressed. As the touch sensor 32 bends, electric charge is accumulated in the piezoelectric elements 22*a*, 22*b* and a voltage is generated. Also, when the voltage is externally applied to the piezoelectric elements 22*a*, 22*b*, the piezoelectric elements 22*a*, 22*b* bend and the touch sensor 32 vibrates bending while being supported by the support members 50 at the four points.

In the supporting structure illustrated in FIG. 2(*b*), the touch sensor 32 is rectangular in shape in the planar view and bendably supported on the display unit 42 (see FIG. 1) via the support members 50 at six points on the rear side of the touch sensor 32: four corners and each center point of the two long sides. Also, on the rear side of the touch sensor 32 outside the display area 42*a* of the display unit 42, the piezoelectric elements 22*a*, 22*b* in the shape of a strip construct the piezoelectric element 22 in FIG. 1 and are adhered along each of two short sides at a center thereof.

Accordingly, in a similar manner to a case in FIG. 2(*a*), the touch sensor 32 slightly bends when the touch face 32*a* is pressed. When the touch sensor 32 bends, electricity is charged to the piezoelectric elements 22*a*, 22*b* and the voltage is generated. Also, when the voltage is externally applied to the piezoelectric elements 22*a*, 22*b*, the piezoelectric elements 22*a*, 22*b* bend and the touch sensor 32 vibrates bending while being supported by the support members 50 at the six points.

Figure 3:
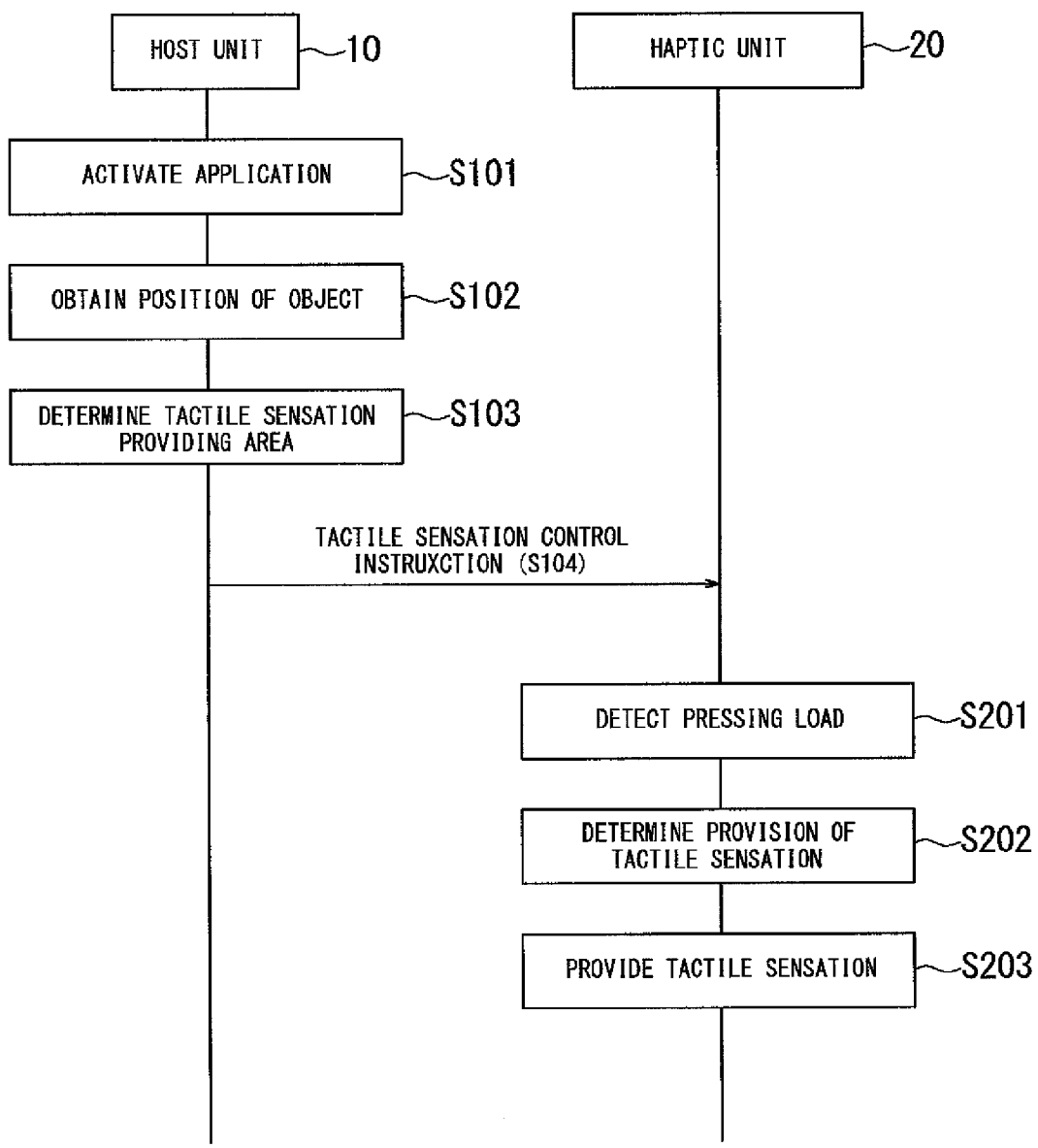
FIG. 3 is a sequence diagram illustrating an example of operations of a host unit and a haptic unit of the tactile sensation providing apparatus illustrated in FIG. 1.

The following is a description of examples of operations of the host unit 10 and the haptic unit 20 of the tactile sensation providing apparatus illustrated in FIG. 1. FIG. 3 is a sequence diagram illustrating an example of operations of the host unit 10 and the haptic unit 20 of the tactile sensation providing apparatus illustrated in FIG. 1.

When the main control unit 11 of the host unit 10 activates an application for providing the tactile sensation, the display unit 42 displays a user interface including the tactile sensation providing area such as a push button and the like (step S101). When the object such as the finger or the like inputs to the touch sensor 32 supported on the display unit 42, the main control unit 11 detects a position of the object by obtaining the input position information from the touch sensor control unit 31 (step S102). Then, the main control unit 11, based on a result of detection of the position of the object, determines whether the object is inputting to a predetermined area (the tactile sensation providing area of the user interface) of the touch face 32*a* (step S103). The main control unit 11, when determining that the object is inputting to the tactile sensation providing area, transmits a tactile sensation control instruction to the tactile sensation provision control unit 21 (step S104). The tactile sensation control instruction includes a number specifying the parameter table for providing a particular tactile sensation. The main control unit 11, by changing the parameter table for providing the tactile sensation according to the application or the tactile sensation providing area, enables the haptic unit 20 to provide a desired tactile sensation.

In the haptic unit 20, upon receiving the tactile sensation control instruction from the main control unit 11, the tactile sensation provision control unit 21 detects the pressing load on the touch sensor 32 by obtaining an output voltage of the piezoelectric element 22 (step S201). Then, the tactile sensation provision control unit 21 determines whether the pressing load satisfies the pressing threshold set in the parameter table specified by the tactile sensation control instruction (step S202). When the pressing load satisfies the pressing threshold, the tactile sensation provision control unit 21 outputs the pressing vibration pattern set in the parameter table to the piezoelectric element 22 such that the tactile sensation is provided to the object (step S203).

According to the present embodiment, as described above, the main control unit 11, based on the output of the touch sensor 32, determines whether the tactile sensation providing area of the touch face 32*a* is touched and, when the tactile sensation providing area is touched, transmits the tactile sensation control instruction to the tactile sensation provision control unit 21. The tactile sensation provision control unit 21, upon receiving the tactile sensation control instruction from the main control unit 11, controls drive of the piezoelectric element 22 serving as the tactile sensation providing unit based on the tactile sensation control instruction and the pressing load. Accordingly, a desired tactile sensation according to the application may be provided without exchange of the signal indicating the pressing load between the host unit 10 and the haptic unit 20 composing a dual chip.

Figure 4:
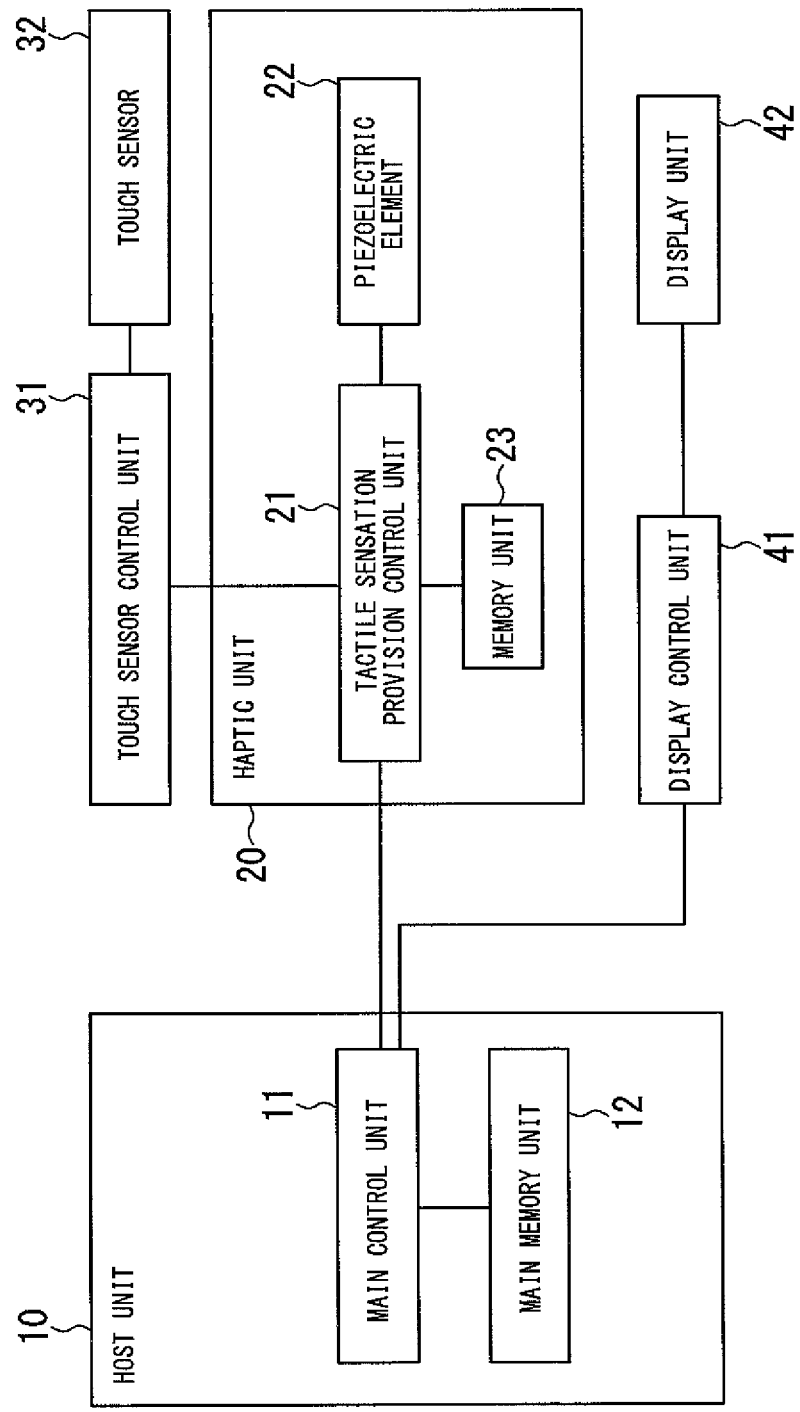
FIG. 4 is a functional block diagram illustrating a schematic configuration of a tactile sensation providing apparatus according to a second embodiment of the present invention.

FIG. 4 is a functional block diagram illustrating a schematic configuration of a tactile sensation providing apparatus according to a second embodiment of the present invention. The tactile sensation providing apparatus illustrated in FIG. 4, in the same manner as the tactile sensation providing apparatus illustrated in FIG. 1, includes the host unit 10 including the main control unit 11 and the main memory unit 12, the haptic unit 20 including the tactile sensation provision control unit 21, the piezoelectric element 22 and the memory unit 23, the touch sensor control unit 31, the touch sensor 32, the display control unit 41 and the display unit 42. Each function block illustrated in FIG. 4 performs a similar operation as the function block having the same reference sign in FIG. 1, and thus detailed description thereof will be omitted. In the tactile sensation providing apparatus illustrated in FIG. 4, unlike the tactile sensation providing apparatus illustrated in FIG. 1, the touch sensor control unit 31 and the tactile sensation provision control unit 21 are connected to each other and the touch sensor control unit 31 and the main control unit 11 are not connected to each other. That is, according to the present embodiment, the touch sensor control unit 31, when there is the touch input to the touch sensor 32, supplies the position information of the touch input to the tactile sensation provision control unit 21 of the haptic unit 20.

Figure 5:
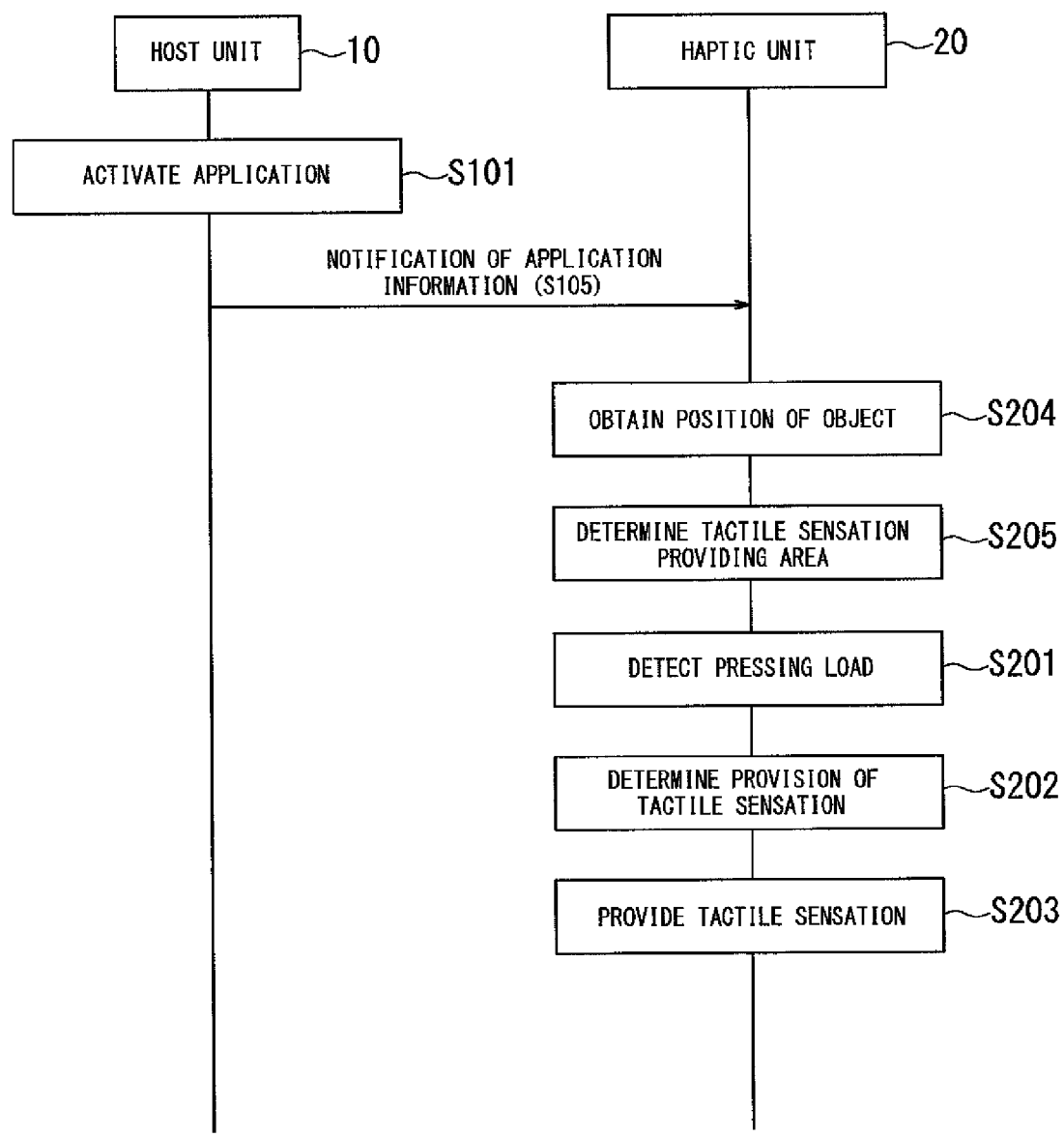
FIG. 5 is a sequence diagram illustrating an example of operations of the host unit and the haptic unit of the tactile sensation providing apparatus illustrated in FIG. 4.

The following is a description of operations of the host unit 10 and the haptic unit 20 of the tactile sensation providing apparatus illustrated in FIG. 4. FIG. 5 is a sequence diagram illustrating an example of operations of the host unit 10 and the haptic unit 20 of the tactile sensation providing apparatus illustrated in FIG. 4.

When the main control unit 11 of the host unit 10 activates the application for providing the tactile sensation, the display unit 42 displays the user interface including the tactile sensation providing area such as the push button and the like (step S101). The main control unit 11 transmits information about the user interface including the tactile sensation providing area, as a notification of application information, to the tactile sensation provision control unit 21 (step S105). The notification of application information includes information about the parameter table for providing the tactile sensation corresponding to each tactile sensation providing area.

When an input takes place to the touch sensor 32 by the object such as the finger or the like, the tactile sensation provision control unit 21 of the haptic unit 20 detects the position of the object by obtaining the input position information from the touch sensor control unit 31 (step S204). Then, the tactile sensation provision control unit 21, based on a result of detection of the position of the object, determines whether the object is inputting to the predetermined area (tactile sensation providing area of the user interface) of the touch face 32a (step S205). When the tactile sensation provision control unit 21 determines that the object is inputting to the tactile sensation providing area, the tactile sensation provision control unit 21 detects the pressing load on the touch sensor 32 by obtaining the output voltage of the piezoelectric element 22 (step S201). Then, the tactile sensation provision control unit 21 determines whether the pressing load satisfies the pressing threshold set in the parameter table specified by the notification of application information from the main control unit 11 (step S202). When the pressing load satisfies the pressing threshold, the tactile sensation provision control unit 21 outputs the pressing vibration pattern set in the parameter table to the piezoelectric element 22 such that the tactile sensation is provided to the object (step S203).

Note that the tactile sensation provision control unit 21 of the haptic unit 20 may inform the main control unit 11 of the host unit 10 of the input position of the object detected at step S204. Thereby, the host unit 10 may perform the application processing based on the position of the touch input.

According to the present embodiment, as described above, the main control unit 11 transmits the notification of application information to the tactile sensation provision control unit 21. The tactile sensation provision control unit 21, upon receiving the notification of application information from the main control unit 11, controls drive of the piezoelectric element 22, serving as the tactile sensation providing unit, based on the output of the touch sensor 32, the notification of application information and the pressing load. Accordingly, a desired tactile sensation according to the application may be provided without exchange of the signal indicating the pressing load between the host unit 10 and the haptic unit 20 composing the dual chip.

Figure 6:
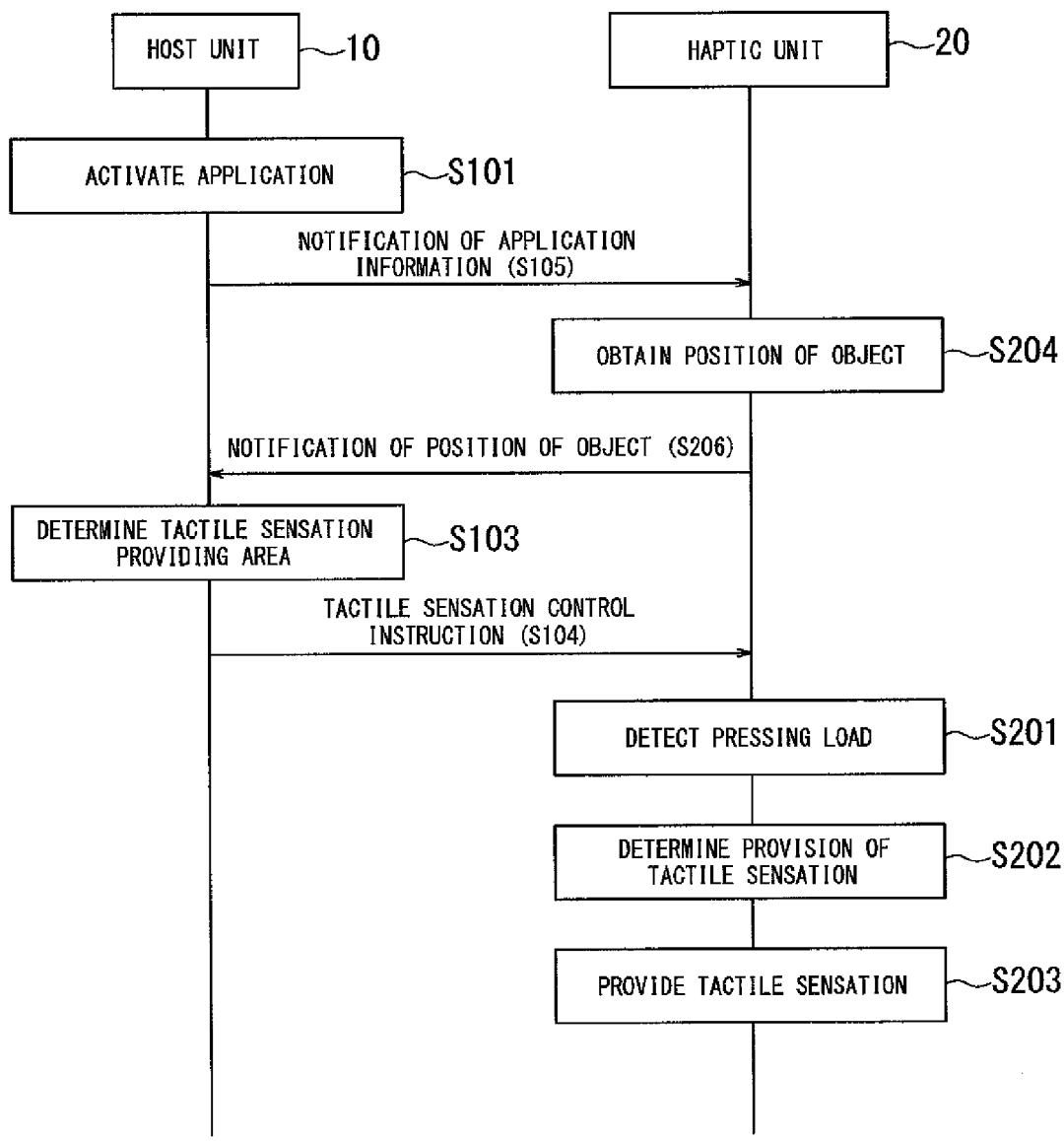
FIG. 6 is a sequence diagram illustrating an example of operations of the host unit and the haptic unit of the tactile sensation providing apparatus illustrated in FIG. 4.

FIG. 6 is a sequence diagram illustrating another example of operations of the host unit 10 and the haptic unit 20 of the tactile sensation providing apparatus illustrated in FIG. 4.

When the main control unit 11 of the host unit 10 activates the application for providing the tactile sensation, the display unit 42 displays the user interface including the tactile sensation providing area such as the push button and the like (step S101). The main control unit 11 transmits the notification of application information to inform that the user interface including the tactile sensation providing area is displayed to the tactile sensation provision control unit 21 (step S105).

When the object such as the finger or the like inputs to the touch sensor 32, the tactile sensation control unit 21 of the haptic unit 20 detects the position of the object by obtaining the input position information from the touch sensor control unit 31 (step S204). Then, the tactile sensation provision control unit 21 informs the main control unit 11 of the host unit 10 of the detected position of the object (step S206).

The main control unit 11, based on the position of the object notified by the tactile sensation provision control unit 21, determines whether the object is inputting to the predetermined area (the tactile sensation providing area of the user interface) of the touch face 32a (step S103). When the main control unit 11 determines that the object is inputting to the tactile sensation providing area, the main control unit 11 transmits the tactile sensation control instruction to the tactile sensation provision control unit 21 (step S104). The tactile sensation control instruction includes a number specifying the parameter table for providing a particular tactile sensation.

The tactile sensation provision control unit 21 of the haptic unit 20, upon receiving the tactile sensation control instruction from the main control unit 11, detects the pressing load on the touch sensor 32 by obtaining the output voltage of the piezoelectric element 22 (step S201). Then, the tactile sensation provision control unit 21 determines whether the pressing load satisfies the pressing threshold set in the parameter table specified by the tactile sensation control instruction transmitted from the main control unit 11 (step S202). When the pressing load satisfies the pressing threshold, the tactile sensation provision control unit 21 outputs the pressing vibration pattern set in the parameter table to the piezoelectric element 22 such that the tactile sensation is provided to the object (step S203).

According to the present embodiment, as described above, the main control unit 11, based on the output of the touch sensor 32 obtained from the tactile sensation provision control unit 21, determines whether the tactile sensation providing area of the touch face 32a is touched and, when the tactile sensation providing area is touched, transmits the tactile sensation control instruction to the tactile sensation provision control unit 21. The tactile sensation provision control unit 21, upon receiving the tactile sensation control instruction from the main control unit 11, controls drive of the piezoelectric element 22 serving as the tactile sensation providing unit based on the tactile sensation control instruction and the pressing load. Accordingly, a desired tactile sensation according to the application may be provided without exchange of the signal indicating the pressing load between the host unit 10 and the haptic unit 20 composing the dual chip.

FIG. 7 is a functional block diagram illustrating a schematic configuration of a tactile sensation providing apparatus according to a third embodiment of the present invention. The tactile sensation providing apparatus illustrated in FIG. 7, in the same manner as the tactile sensation providing apparatus illustrated in FIG. 1, includes the host unit 10 including the main control unit 11 and the main memory unit 12, the haptic unit 20 including the tactile sensation provision control unit 21, the piezoelectric element 22 and the memory unit 23, the touch sensor control unit 31, the touch sensor 32, the display control unit 41 and the display unit 42. Each function block illustrated in FIG. 7 performs a similar operation as the function block having the same reference sign in FIG. 1, and thus detailed description thereof will be omitted.

The tactile sensation providing apparatus illustrated in FIG. 7, unlike the tactile sensation providing apparatus illustrated in FIG. 1 and FIG. 4, the touch sensor control unit 31 and the main control unit 11 are connected to each other and the touch sensor control unit 31 and the tactile sensation provision control unit 21 are connected to each other. That is, according to the present embodiment, the touch sensor control unit 31, when there is the touch input to the touch sensor 32, supplies the position information of the touch input to the main control unit 11 of the host unit 10 and the tactile sensation provision control unit 21 of the haptic unit 20. That is, the host unit 10 and the haptic unit 20 of the tactile sensation providing apparatus illustrated in FIG. 7 may perform any of the operations illustrated in FIG. 3, FIG. 5 and FIG. 6.

It is to be understood that the present invention is not limited to the above embodiments but may be modified or varied in a multiple of manners. For example, it may be preferred that the main control unit 11 controls the haptic unit 20 based on a parameter table for providing the tactile sensation that is not stored in the memory unit 23 of the haptic unit 20. In such a case, the main control unit 11 may include the parameter table for providing the tactile sensation in the tactile sensation control instruction (S104) or the notification of application information (S105) and transmit the instruction or the notification to the tactile sensation provision control unit 21. The tactile sensation provision control unit 21, upon receiving the parameter table, may drive the piezoelectric element 22 based on the received parameter table and store the received parameter table in the memory unit 23.

Also, although the piezoelectric element 22 serves as the tactile sensation providing unit and the load detection unit in the above embodiments, the tactile sensation providing unit and the load detection unit may be provided separately. In such a case, the tactile sensation providing unit may be configured by using, not limited to the piezoelectric element, but other known vibration means such as an eccentric motor, solenoid and the like. Also, the touch sensor may be supported via laminated piezoelectric elements. Similarly, the load detection unit may be configured by using, not limited to the piezoelectric element, but other known load detection means such as a strain gauge sensor and the like. Moreover, the load detection unit may be omitted. Further, the present invention is also applicable to a tactile sensation providing apparatus including no display unit but including a touch sensor having the tactile sensation providing area directly depicted thereon by printing or the like.

REFERENCE SIGNS LIST 10 host unit
11 main control unit
12 main memory unit
20 haptic unit
21 tactile sensation provision control unit
22 piezoelectric element
23 memory unit
31 touch sensor control unit
32 touch sensor
41 display control unit
42 display unit
50 support member

The invention claimed is:
1. A tactile sensation providing apparatus comprising:
a touch sensor;
a load detection unit configured to detect a pressing load on the touch sensor;
a tactile sensation providing unit configured to vibrate a touch face of the touch sensor;
a tactile sensation provision control unit configured as a first chip to control drive of the tactile sensation providing unit;
a memory unit being connected to the tactile sensation provision control unit and storing a plurality of parameters for providing tactile sensation; and
a main control unit configured as a second chip to control drive of the tactile sensation provision control unit based on an output of the touch sensor, wherein
the main control unit determines whether a predetermined area of the touch face is touched based on the output of the touch sensor and, when the predetermined area is touched, transmits a tactile sensation control instruction including information specifying a parameter for providing tactile sensation to the tactile sensation provision control unit,
the tactile sensation provision control unit, upon receiving the tactile sensation control instruction from the main control unit, specifies the parameter for providing tactile sensation and controls drive of the tactile sensation providing unit based on the tactile sensation control instruction and the pressing load, and
the tactile sensation control instruction includes information specifying a parameter for providing a tactile sensation.

2. A control method for a tactile sensation providing apparatus including
a touch sensor,
a load detection unit configured to detect a pressing load on the touch sensor,
a tactile sensation providing unit configured to vibrate a touch face of the touch sensor,
a tactile sensation provision control unit configured as a first chip to control drive of the tactile sensation providing unit,
a memory unit being connected to the tactile sensation provision control unit and storing a plurality of parameters for providing tactile sensation, and
a main control unit configured as a second chip to control drive of the tactile sensation provision control unit based on an output of the touch sensor, comprising steps for:

the main control unit determining whether a predetermined area of the touch face is touched based on the output of the touch sensor and, when the predetermined area is touched, to transmit a tactile sensation control instruction including information specifying a parameter for providing tactile sensation to the tactile sensation provision control unit; and the tactile sensation provision control unit specifying the parameter for providing tactile sensation and controlling drive of the tactile sensation providing unit, upon receiving the tactile sensation control instruction from the main control unit, based on the tactile sensation control instruction and the pressing load, wherein the tactile sensation control instruction includes information specifying a parameter for providing a tactile sensation.

3. A tactile sensation providing apparatus comprising:

a touch sensor;

a load detection unit configured to detect a pressing load on the touch sensor;

a tactile sensation providing unit configured to vibrate a touch face of the touch sensor;

a tactile sensation provision control unit configured as a first chip to control drive of the tactile sensation providing unit;

a memory unit being connected to the tactile sensation provision control unit and storing a plurality of parameters for providing tactile sensation; and a main control unit configured as a second chip to control an application associated with provision of a tactile sensation, wherein the main control unit transmits a notification, which includes information specifying a parameter for providing tactile sensation, about the application to the tactile sensation provision control unit, the tactile sensation provision control unit, upon receiving the notification from the main control unit, specifies the parameter for providing for providing tactile sensation and controls drive of the tactile sensation providing unit based on an output of the touch sensor, the notification and the pressing load, and the notification includes information specifying a parameter for providing a tactile sensation.

4. A control method for a tactile sensation providing apparatus including a touch sensor, a load detection unit configured to detect a pressing load on the touch sensor, a tactile sensation providing unit configured to vibrate a touch face of the touch sensor, a tactile sensation provision control unit configured as a first chip to control drive of the tactile sensation providing unit, a memory unit being connected to the tactile sensation provision control unit and storing a plurality of parameters for providing tactile sensation, and a main control unit configured as a second chip to control an application associated with provision of a tactile sensation, comprising steps for:

the main control unit transmitting a notification, which includes information specifying a parameter for providing tactile sensation, about the application to the tactile sensation provision control unit; and the tactile sensation provision control unit specifying the parameter for providing tactile sensation and controlling drive of the tactile sensation providing unit, upon receiving the notification from the main control unit, based on an output of the touch sensor, the notification and the pressing load, wherein the notification includes information specifying a parameter for providing a tactile sensation.

\* \* \* \* \*